United States Patent
Ishihara et al.

(10) Patent No.: US 9,261,883 B2
(45) Date of Patent: Feb. 16, 2016

(54) SYSTEMS AND METHODS FOR PERFORMING EXCESSIVE NEGATIVE PITCH ALERT AND FOR BIASING A SINK RATE ALERT

(75) Inventors: Yasuo Ishihara, Kirkland, WA (US); Steve Johnson, North Bend, WA (US); Gary Ostrom, Bellevue, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 317 days.

(21) Appl. No.: 12/821,591

(22) Filed: Jun. 23, 2010

(65) Prior Publication Data

US 2011/0276200 A1 Nov. 10, 2011

Related U.S. Application Data

(60) Provisional application No. 61/332,564, filed on May 7, 2010.

(51) Int. Cl.
- *G08B 23/00* (2006.01)
- *G05D 1/08* (2006.01)
- *G01C 23/00* (2006.01)

(52) U.S. Cl.
CPC .............. *G05D 1/0858* (2013.01); *G01C 23/00* (2013.01)

(58) Field of Classification Search
USPC .................................................. 701/9; 340/967
See application file for complete search history.

(56) References Cited

U.S. PATENT DOCUMENTS

| | | | | |
|---|---|---|---|---|
| 4,189,777 A * | 2/1980 | Kuntman | | 701/9 |
| 4,551,723 A * | 11/1985 | Paterson | | B64C 27/006 244/17.11 |
| 4,567,483 A * | 1/1986 | Bateman et al. | | 340/970 |
| 5,001,476 A * | 3/1991 | Vermilion | | G01C 5/005 340/963 |
| 5,038,141 A * | 8/1991 | Grove | | 340/970 |
| 5,136,518 A * | 8/1992 | Glover | | G05D 1/0623 244/181 |
| 5,153,588 A * | 10/1992 | Muller | | 340/968 |
| 5,166,682 A * | 11/1992 | Bateman | | 340/970 |
| 5,377,937 A * | 1/1995 | LaMay | | G05D 1/0676 244/185 |
| 5,677,685 A * | 10/1997 | Coirier | | G05D 1/0607 244/184 |
| 6,341,248 B1 * | 1/2002 | Johnson | | G05D 1/0833 244/1 R |
| 6,906,641 B2 * | 6/2005 | Ishihara | | B64D 45/04 340/946 |
| 6,940,427 B2 * | 9/2005 | Bateman | | 340/967 |
| 7,403,133 B2 * | 7/2008 | He et al. | | 340/974 |
| 2002/0030607 A1 * | 3/2002 | Conner | | B64C 27/82 340/945 |

(Continued)

OTHER PUBLICATIONS

CN Office Action for Application 201110159236.6 dated Jun. 26, 2014.

(Continued)

*Primary Examiner* — Jonathan M Dager
(74) *Attorney, Agent, or Firm* — Ingrassia Fisher & Lorenz, P.C.

(57) ABSTRACT

Systems and methods that alert the pilot of the unusual negative pitch attitude. Additionally, the system can bias a "sink rate" envelope toward a more sensitive direction, such that the pilot can be alerted while (or before) a large sink rate is built up during an unusual negative pitch attitude condition.

3 Claims, 6 Drawing Sheets

(56) References Cited

U.S. PATENT DOCUMENTS

| | | | | |
|---|---|---|---|---|
| 2002/0089433 A1* | 7/2002 | Bateman | ................ | G01C 5/005 340/970 |
| 2003/0016145 A1* | 1/2003 | Bateman | ................ | B64D 43/02 340/967 |
| 2003/0225492 A1* | 12/2003 | Cope et al. | ...................... | 701/35 |
| 2004/0044446 A1* | 3/2004 | Staggs | .................. | G08G 5/025 701/16 |
| 2004/0075586 A1* | 4/2004 | Glover | .................. | B64D 45/04 340/963 |
| 2007/0085705 A1* | 4/2007 | He | ........................ | G01C 23/00 340/967 |
| 2009/0319105 A1* | 12/2009 | Conner | .................... | G08G 5/02 701/16 |
| 2010/0023264 A1* | 1/2010 | G. | ........................... | G08G 5/04 701/301 |
| 2010/0141482 A1* | 6/2010 | Wyatt | ..................... | G01C 23/00 340/975 |
| 2011/0202207 A1* | 8/2011 | Louise | ................. | G05D 1/0676 701/5 |

OTHER PUBLICATIONS

CN Office Action for CN 2011 10159236.6; Date of Issuance May 29, 2015.

CN Office Action for Application 201110159236.6 dated Dec. 1, 2014.

* cited by examiner

SYSTEMS AND METHODS FOR PERFORMING EXCESSIVE NEGATIVE PITCH ALERT AND FOR BIASING A SINK RATE ALERT

PRIORITY CLAIM

This application claims priority to Provisional Application Ser. No. 61/332,564 filed on May 7, 2010 and is incorporated herein by reference.

BACKGROUND OF THE INVENTION

In many helicopter accidents, pilots get disoriented, and often drop the helicopter's nose (negative pitch) without noticing it. Sometimes pilots get confused and in some cases, pilots don't realize what is going on and end up crashing into the ocean or ground.

SUMMARY OF THE INVENTION

An unusual negative pitch attitude (e.g., −20 degrees) is the first sign that the helicopter is about to dive and accelerate. The present invention provides systems and methods that alert the pilot of the unusual negative pitch attitude.

Additionally, the system can bias a "sink rate" envelope toward a more sensitive direction, such that the pilot can be alerted while (or before) a large sink rate is built up during an unusual negative pitch attitude condition.

The present invention includes a processing device that receives a current pitch angle value and generates an alert if the received pitch angle value is more negative than a predefined pitch angle threshold value. An output device outputs the generated alert.

The processing device is further configured to adjust the pitch angle threshold value based on altitude.

In one aspect of the invention, a system includes a processing device that receives a current pitch angle value, adjusts a sink rate alert envelope if the received pitch angle value is more negative than a pitch angle threshold value, and generates an alert if sink rate is within the sink rate alert envelope. A output device outputs the generated alert.

In another aspect of the invention, the processing device adjusts the sink rate alert envelope only if the sink rate alert envelope was previously at a default position.

In still another aspect of the invention, the processing device returns the pitch rate alert envelope to the default position if the received pitch angle value is not more negative than a pitch angle threshold value.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
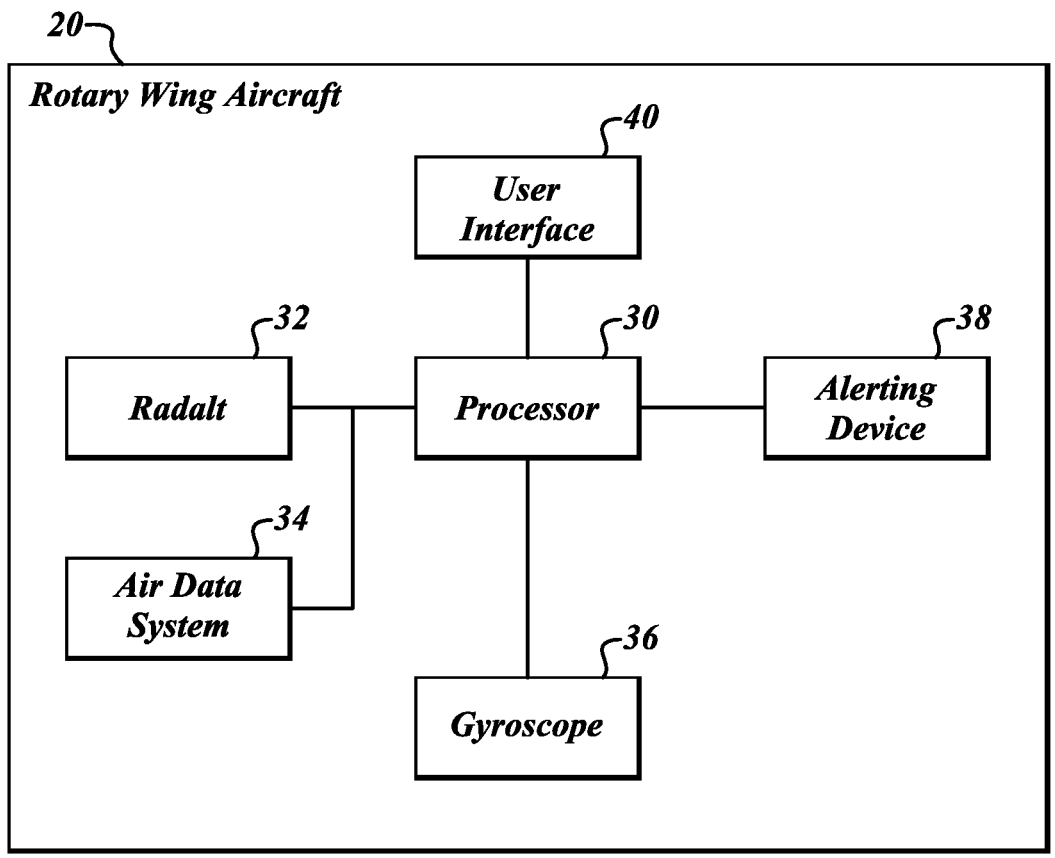
FIG. 1 illustrates a block diagram of a system on a rotary-wing aircraft formed in accordance with an embodiment of the present invention.

FIG. 1 is a block diagram of a rotary-wing aircraft 20 that includes a processor 30, such as an enhanced ground proximity warning system (EGPWS) processor. The aircraft 20 also includes a radio altimeter (RADALT) 32 and an air data system 34, a gyroscope 36, and an alerting device 38 that are all in signal communication with the processor 30, and a user interface device 40.

The processor 30 includes instructions for alerting the pilot of the aircraft 20 if the pitch attitude is beyond a threshold negative value and/or adjusting a prestored sink rate envelope based on a pitch attitude received from the gyroscope 36. If the processor 30 determines that either a "nose-too-low" or a pitch rate alert is necessary, then a corresponding alert signal is sent to the alerting device 38 that outputs a corresponding alert audibly and/or visually.

Figure 2:
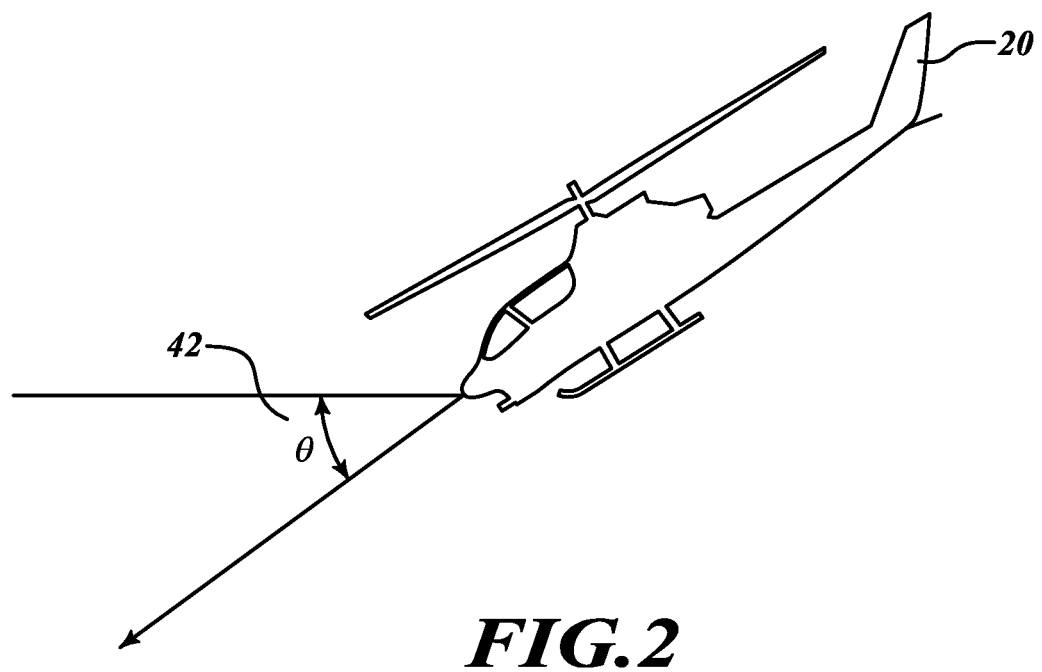
FIG. 2 illustrates a side view of a helicopter in an excessive negative pitch attitude.

FIG. 2 illustrates the rotary-wing aircraft 20 that is presently at a pitch angle θ 42 that is below the pitch angle threshold value. In such a situation, the processor 30 will alert the pilot that the nose is too low and that an acceleration condition may exist.

Figure 3:
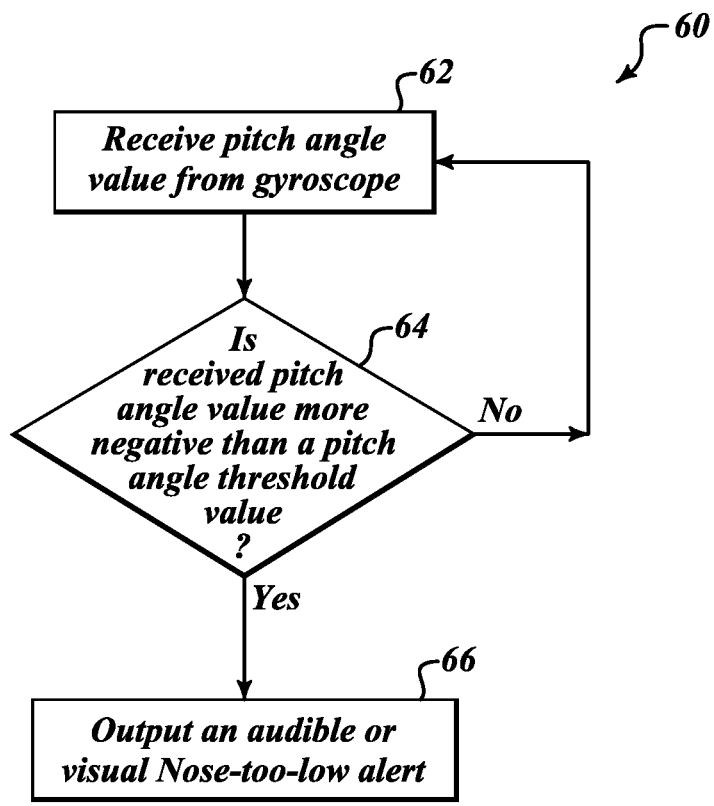
FIG. 3 is a flowchart identifying a potentially hazardous negative pitch condition.

FIG. 3 illustrates a process 60 performed by the processor 30 for alerting the flight crew of an excessive pitch angle attitude. First, at a block 62, a pitch angle value is received from the gyroscope 36. Next, at a decision block 64, the processor 30 determines if the received pitch angle value is more negative than a pitch angle threshold value θ 42. If the received pitch angle value is not more negative than the pitch angle threshold value, the process returns to block 62. If, however, the received pitch angle value is more negative than the pitch angle threshold value, the processor 30 generates and outputs an audible or visual "nose-too-low" alert.

Figure 4:
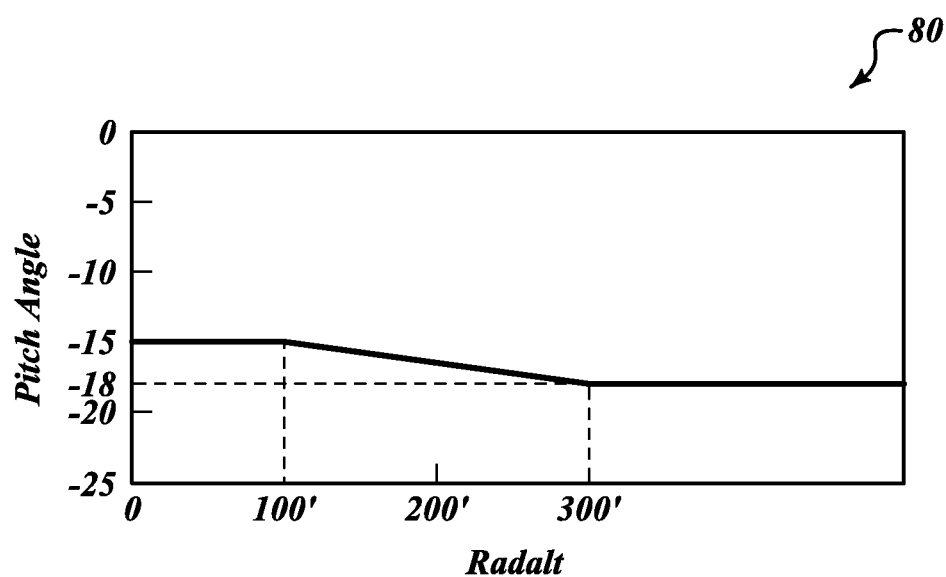
FIG. 4 illustrates a graph associated with the process shown in FIG. 3.

FIG. 4 illustrates a graph 80 that shows a change in the pitch angle threshold value based on altitude. For example, the graph 80 shows that below 100 feet the pitch angle threshold value is −15 degrees but is a graduated scale to between 100 feet and 300 feet, up to a threshold of −18 degrees. This provides more sensitivity to this condition when the aircraft is lower to the ground.

Figure 5:
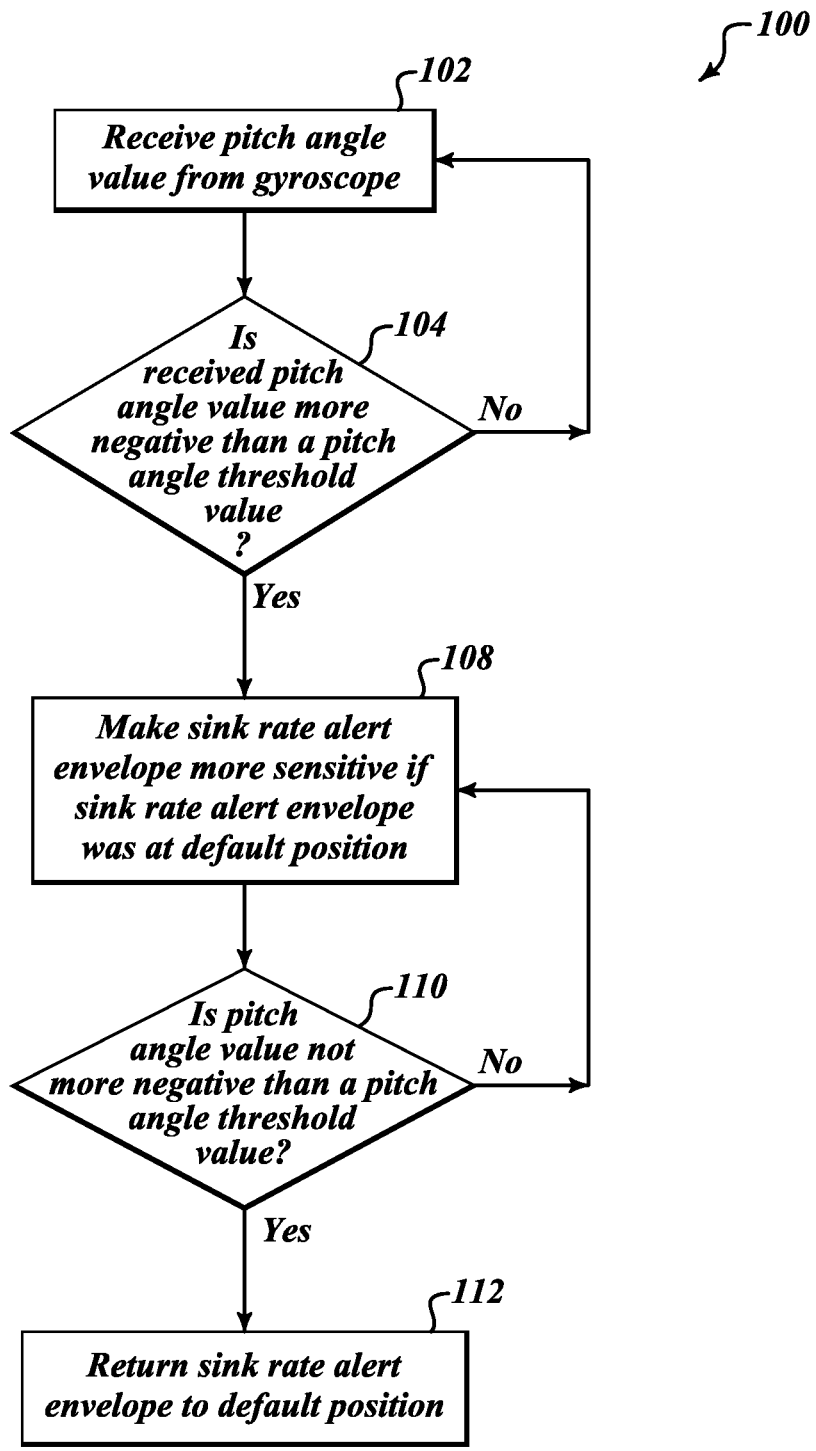
FIG. 5 is a flowchart of an exemplary process for biasing a sink rate alert envelope.

FIG. 5 illustrates an exemplary process 100 performed by the processor 30 for adjusting a sink rate alert envelope. First, at a block 102, just like in block 62 of FIG. 3, the pitch angle value is received from the gyroscope 36. Next, at a decision block 104, the processor 30 determines if the received pitch angle value is more negative than a pitch angle threshold value. If not, the process 100 returns to the block 102. If the pitch angle value is determined to be more negative than the pitch angle threshold value, then at a block 108, a sink rate alert envelope is made more sensitive if the sink rate alert envelope is presently at its default position. In other words, the sink rate alert envelope is not made more sensitive if it has previously been made more sensitive. Next, at a decision block 110, the processor 30 determines if the pitch angle value is not more negative than the pitch angle threshold value. What is occurring here is a determination as to whether the state is still active. If the state is of a pitch angle value greater negative than the pitch angle threshold value, then the process 100 stays in its current state. However, if the pitch angle value becomes not more negative than the pitch angle threshold value, then, at a block 112, the sink rate alert envelope defaults or returns to its default position.

Figure 6:
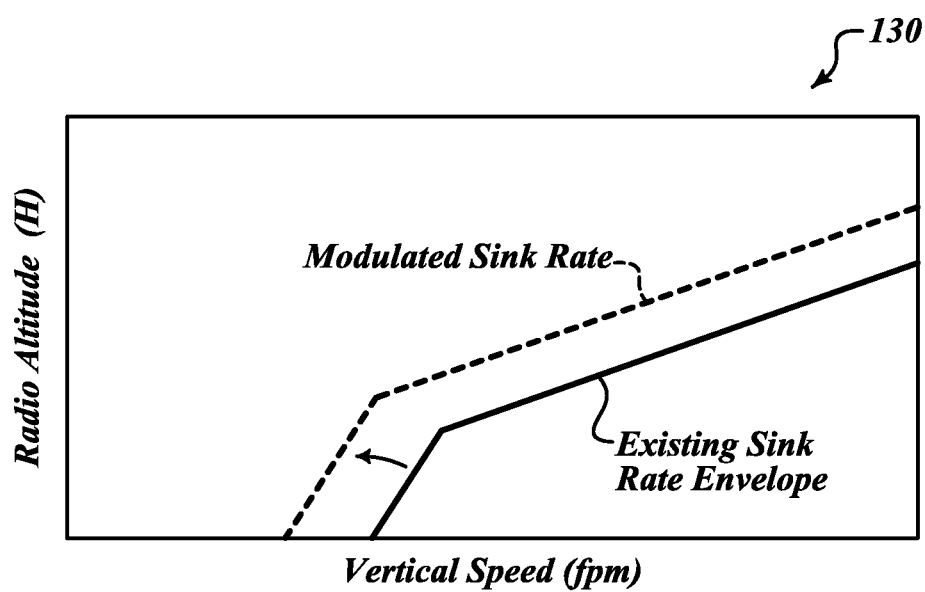
FIG. 6 illustrates a sink rate alert envelope adjusted according to the process shown in FIG. 5.

FIG. 6 illustrates a graph 130 that shows the sink rate alert envelope plotted with vertical speed (feet per minute (FPM))

on an x axis and an altitude (radio altitude (H)) along the y axis. The solid line indicates the existing or default sink rate envelope. When the condition is met where the pitch angle value of the aircraft 20 is more negative than the pitch angle threshold value, then the sink rate envelope becomes modulated to a more sensitive position, as indicated by the dashed line to the left along the x axis within the graph 130.

While the preferred embodiment of the invention has been illustrated and described, as noted above, many changes can be made without departing from the spirit and scope of the invention. For example, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system located on an aircraft, the system comprising:
    a processing device configured to:
        receive a current pitch angle value, and a current aircraft altitude;
        set a pitch angle threshold value based on the current aircraft altitude;
        generate a first alert if the received pitch angle value is more negative than the pitch angle threshold value;
        adjust a sink rate alert envelope if the received pitch angle value is more negative than the pitch angle threshold value;
        receive a sink rate value; and
        generate a second alert if sink rate is within the sink rate alert envelope
    an output device configured to output the generated alerts,
    wherein the pitch angle threshold value is set to:
        a first value when the current altitude is below a first altitude,
        a second value when the current altitude is above a second altitude, and
        a value that varies linearly between the first value and the second value when the current altitude is between the first altitude and the second altitude, and
        wherein the second value is greater in magnitude than the first value, and the second altitude is greater than the first altitude.

2. The system of claim 1, wherein the processing device adjusts the sink rate alert envelope only if the sink rate alert envelope was previously at a default position.

3. The system of claim 2, wherein the processing device returns the sink rate alert envelope to the default position if the received pitch angle value is not more negative than a pitch angle threshold value.

* * * * *